United States Patent
Jänis et al.

(10) Patent No.: US 9,420,485 B2
(45) Date of Patent: Aug. 16, 2016

(54) FRAME STRUCTURE AND SIGNALING ARRANGEMENT FOR INTERFERENCE AWARE SCHEDULING

(75) Inventors: Pekka Jänis, Espoo (FI); Cassio Ribeiro, Espoo (FI); Klaus Hugl, Vienna (AT)

(73) Assignee: NOKIA TECHNOLOGIES OY, Espoo (FI)

(*) Notice: Subject to any disclaimer, the term of this patent is extended or adjusted under 35 U.S.C. 154(b) by 140 days.

(21) Appl. No.: 13/976,651

(22) PCT Filed: Jan. 4, 2011

(86) PCT No.: PCT/IB2011/050025
§ 371 (c)(1),
(2), (4) Date: Jul. 31, 2013

(87) PCT Pub. No.: WO2012/093289
PCT Pub. Date: Jul. 12, 2012

(65) Prior Publication Data
US 2014/0313948 A1  Oct. 23, 2014

(51) Int. Cl.
*H04W 80/04* (2009.01)
*H04W 84/12* (2009.01)
*H04W 24/10* (2009.01)
*H04W 48/08* (2009.01)
*H04L 5/00* (2006.01)
*H04L 5/14* (2006.01)
(Continued)

(52) U.S. Cl.
CPC .............. *H04W 24/10* (2013.01); *H04L 5/003* (2013.01); *H04L 5/14* (2013.01); *H04W 48/08* (2013.01); *H04W 28/048* (2013.01); *H04W 72/1226* (2013.01)

(58) Field of Classification Search
CPC ..... H04W 80/04; H04W 36/30; H04W 24/00; H04W 84/12; H04W 70/04
See application file for complete search history.

(56) References Cited

U.S. PATENT DOCUMENTS

2001/0033560 A1* 10/2001 Tong ................... H04B 7/2656
                                                  370/337
2002/0057751 A1*  5/2002 Jagger ................. H04B 1/1036
                                                  375/346
(Continued)

FOREIGN PATENT DOCUMENTS

EP          1855423         11/2007

OTHER PUBLICATIONS

International Search Report received for corresponding Patent Cooperation Treaty Application No. PCT/IB2011/050025, dated Sep. 22, 2011, 5 pages.

(Continued)

*Primary Examiner* — Andrew Lee
(74) *Attorney, Agent, or Firm* — Squire Patton Boggs (US) LLP

(57) ABSTRACT

Frame structures and signaling arrangements for interference aware scheduling may be applicable to a local area radio system to complement existing wide area cellular systems, like GSM/UMTS/HSPA/LTE. In certain embodiments a method is provided including preparing a frame for transmission in a wireless communication system. The method can also include incorporating an interference report into the frame. The interference report is directly associated with a corresponding resource. The method can further include transmitting the interference report within the frame in the wireless communication system.

23 Claims, 12 Drawing Sheets

(51) Int. Cl.
*H04W 28/04* (2009.01)
*H04W 72/12* (2009.01)

(56) References Cited

U.S. PATENT DOCUMENTS

| | | | |
|---|---|---|---|
| 2008/0056334 A1* | 3/2008 | Suh | H04W 28/22 375/132 |
| 2008/0198785 A1* | 8/2008 | Huang et al. | 370/312 |
| 2008/0267105 A1* | 10/2008 | Wang et al. | 370/311 |
| 2009/0074033 A1* | 3/2009 | Kattwinkel | H04B 1/7143 375/132 |
| 2009/0098904 A1* | 4/2009 | Fujii | H04W 16/14 455/552.1 |
| 2009/0175324 A1* | 7/2009 | Sampath | H04L 5/0007 375/222 |
| 2009/0232105 A1* | 9/2009 | Kesselman | H01Q 3/26 370/336 |
| 2009/0274078 A1* | 11/2009 | Zhao et al. | 370/293 |
| 2010/0016023 A1* | 1/2010 | Yamauchi | H04L 5/0037 455/562.1 |
| 2010/0097965 A1* | 4/2010 | Kwon et al. | 370/294 |
| 2010/0222003 A1* | 9/2010 | Yoshii et al. | 455/63.3 |
| 2011/0032850 A1* | 2/2011 | Cai | H04L 5/0023 370/280 |
| 2011/0039549 A1* | 2/2011 | Niki et al. | 455/423 |
| 2011/0090885 A1* | 4/2011 | Safavi | 370/338 |
| 2011/0170424 A1* | 7/2011 | Safavi | H04L 43/0811 370/242 |
| 2011/0176461 A1* | 7/2011 | Astely et al. | 370/280 |
| 2011/0217985 A1* | 9/2011 | Gorokhov | H04W 24/10 455/452.2 |
| 2011/0244870 A1* | 10/2011 | Lee | 455/444 |
| 2012/0082038 A1* | 4/2012 | Xu et al. | 370/244 |
| 2013/0039324 A1* | 2/2013 | Kwon et al. | 370/329 |
| 2013/0107740 A1* | 5/2013 | Mese | H04L 1/0017 370/252 |

OTHER PUBLICATIONS

3GPP TR 36.922 V9.1.0; "TDD Home eNode B (HeNB) Radio Frequency (RF) requirements analysis", Jun. 2010; Section 1, section 7.3.1.2, section 7.4.2.2.

3GPP TR 36.921 v9.0 "FDD Home eNode (HeNB) Radio Frequency (RF) requirements analysis", (Mar. 2010); Table 7.1.3-1, section 7.2.2.6.

I2R: "eICIC for HeNB UL and MUE DL based on HeNB UL Measurement", 3GPP TSG RAN WG1 Me3eting #62, vol. R1-104732 Madrid, Spain, Aug. 23, 2010.

* cited by examiner

Legend:
1110: Support Node
1120: Access Point
1130: User Equipment
1140: Memory
1150: Computer Program Instructions
1160: Processor
1170: Wireless Link
1180: Wired Link
1190: Transceiver

FRAME STRUCTURE AND SIGNALING ARRANGEMENT FOR INTERFERENCE AWARE SCHEDULING

RELATED APPLICATION

This application was originally filed as PCT Application No. PCT/IB2011/050025 filed Jan. 4, 2011.

BACKGROUND

1. Field

Frame structures and signaling arrangements for interference aware scheduling may be applicable to a local area radio system to complement existing wide area cellular systems, like global system for mobile communication (GSM), universal mobile telecommunications system (UMTS), high speed packet access (HSPA), or long term evolution (LTE). Unlike a wide area cellular system, a local area system can utilize license-exempt spectrum or white spaces to take advantage of the additional available bandwidth. In addition local area systems may offer efficient device-to-device operation mode to establish ad hoc networks. Frame structures and signaling arrangements for interference aware scheduling may also be applicable to other communication systems, such as heterogeneous systems or wide area systems.

2. Description of the Related Art

Interference aware scheduling can be performed in a variety of ways. For example, interference aware scheduling can involve receiving a neighbor node's interference report and subtracting the recipient node's own caused interference from the neighbor's report when determining interference characteristics.

Additionally, interference aware scheduling can take into account a neighbor weighting factor, to take into account the importance of the interfered-with resource to the neighbor node. Furthermore, interference aware scheduling can make use of a locally common or combined, synchronously transmitted interference report.

SUMMARY

In certain embodiments a method is provided including preparing a frame for transmission in a wireless communication system. The method also includes incorporating an interference report into the frame. The interference report is directly associated with a corresponding resource. The method further includes transmitting the interference report within the frame in the wireless communication system.

A method is provided in certain embodiments including negotiating a frame structure arrangement with an access point. The method also includes signaling resources to be used for reporting and the mapping between data resources and reporting resources to a user equipment.

A method including negotiating a frame structure arrangement with an access point of a neighbor cell is provided in accordance with certain embodiments. The method also includes sensing power values in a neighbor cell report on at least one orthogonal channel or receiving the power values as sensed by and reported from at least one user equipment. The method additionally includes selecting a least interfered orthogonal channel to be used for reports in an own cell. The method further includes signaling the selected orthogonal channel to a user equipment served by the own cell.

In certain embodiments, an apparatus is provided including at least one memory including computer program code and at least one processor. The at least one memory and the computer program code are configured to, with the at least one processor, cause the apparatus at least to prepare a frame for transmission in a wireless communication system. The at least one memory and the computer program code are also configured to, with the at least one processor, cause the apparatus at least to incorporate an interference report into the frame. The interference report is directly associated with a corresponding resource. The at least one memory and the computer program code are further configured to, with the at least one processor, cause the apparatus at least to transmit the interference report within the frame in the wireless communication system.

An apparatus, in certain embodiments, is provided including at least one memory including computer program code and at least one processor. The at least one memory and the computer program code are configured to, with the at least one processor, cause the apparatus at least to negotiate a frame structure arrangement with an access point. The at least one memory and the computer program code are also configured to, with the at least one processor, cause the apparatus at least to signal resources to be used for reporting and the mapping between data resources and reporting resources to a user equipment.

An apparatus is provided including at least one memory including computer program code and at least one processor, in accordance with certain embodiments. The at least one memory and the computer program code are configured to, with the at least one processor, cause the apparatus at least to negotiate a frame structure arrangement with an access point of a neighbor cell. The at least one memory and the computer program code are also configured to, with the at least one processor, cause the apparatus at least to sense power values in a neighbor cell report on at least one orthogonal channel or receive the power values as sensed by and reported from at least one user equipment. The at least one memory and the computer program code are also configured to, with the at least one processor, cause the apparatus at least to select a least interfered orthogonal channel to be used for reports in an own cell. The at least one memory and the computer program code are further configured to, with the at least one processor, cause the apparatus at least to signal the selected orthogonal channel to a user equipment served by the own cell.

In certain embodiments, an apparatus is provided including preparing means for preparing a frame for transmission in a wireless communication system. The apparatus also includes incorporating means for incorporating an interference report into the frame. The interference report is directly associated with a corresponding resource. The apparatus further includes transmitting means for transmitting the interference report within the frame in the wireless communication system.

An apparatus is, in certain embodiments, provided including negotiating means for negotiating a frame structure arrangement with an access point. The apparatus also includes signaling means for signaling resources to be used for reporting and the mapping between data resources and reporting resources to a user equipment.

An apparatus is provided including negotiating means for negotiating a frame structure arrangement with an access point of a neighbor cell. The apparatus also includes sensing means for sensing power values in a neighbor cell report on at least one orthogonal channel or receive the power values as sensed by and reported from at least one user equipment, in accordance with certain embodiments. The apparatus also includes selecting means for selecting a least interfered orthogonal channel to be used for reports in an own cell. The apparatus further includes signaling means for signaling the selected orthogonal channel to a user equipment served by the own cell.

In certain embodiments a computer-readable medium is provided encoded with instructions that, when executed in hardware, perform a process. The process includes preparing a frame for transmission in a wireless communication system. The process also includes incorporating an interference report into the frame. The interference report is directly associated with a corresponding resource. The process further includes transmitting the interference report within the frame in the wireless communication system.

A computer-readable medium, in certain embodiments, is provided encoded with instructions that, when executed in hardware, perform a process. The process includes negotiating a frame structure arrangement with an access point. The process also includes signaling resources to be used for reporting and the mapping between data resources and reporting resources to a user equipment.

A computer-readable medium encoded with instructions that, when executed in hardware, perform a process, is provided in accordance with certain embodiments. The process includes negotiating a frame structure arrangement with an access point of a neighbor cell. The process also includes sensing power values in a neighbor cell report on at least one orthogonal channel or receiving the power values as sensed by and reported from at least one user equipment. The process additionally includes selecting a least interfered orthogonal channel to be used for reports in an own cell. The process further includes signaling the selected orthogonal channel to a user equipment served by the own cell.

BRIEF DESCRIPTION OF THE DRAWINGS

For proper understanding of the invention, reference should be made to the accompanying drawings, wherein.

DETAILED DESCRIPTION OF THE PREFERRED EMBODIMENT(S)

Figure 1:
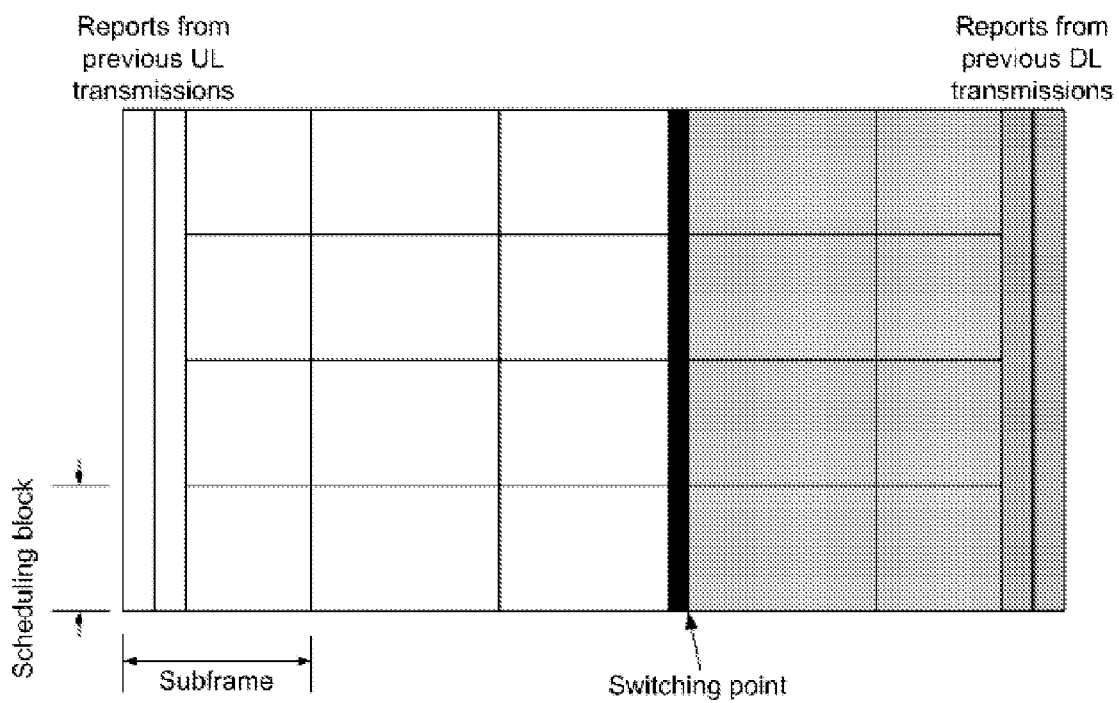
FIG. 1 illustrates reports embedded as part of corresponding downlink and uplink resources.

In contrast to classical cellular networks with sophisticated base stations (BSs) and careful frequency planning, advanced local area networks may provide less expensive access points (APs) and uncoordinated deployment. In some cases a terminal with limited hardware/software resources may have to serve as an access point. Such factors may lead to decentralized medium access control (MAC). This is a significant change from strictly centralized cellular scheduling.

The uncoordinated deployment means that efficient interference management within the network may be helpful. Currently, home wireless networks are mostly based on the IEEE 802.11 standard, which is optimized for situation with single access point. The 802.11 standard has three orthogonal channels available, but in buildings with lots of apartments and thus many interfering networks, this may be insufficient.

Certain embodiments of the present invention may provide a time division duplex (TDD) frame structure that allows for an interference-aware scheduling mechanism in advanced local area networks, which improves interference management resulting in higher user throughputs. The performance improvement is particularly noticeable in difficult interference scenarios, for example with multiple closed subscriber groups and flexible uplink (UL)/downlink (DL) switching points.

In certain wireless communication scenarios, system-wise fairness can be achieved if a transmitter is allowed to transmit if and only if the benefits from the transmission outweigh the losses of the other receivers on the same resources. This is particularly relevant in challenging scenarios that arise from multiple closed subscriber groups (CSGs) and flexible uplink/downlink switching points, where the links to the interference victim can be even stronger than that to a user equipment's own Access Point (AP).

Evaluation of fairness can take into account that transmitters must be able to sense receivers and hence receivers must broadcast the interference situation. This can be achieved by means of reports that describe the interference situation in the previously used resources. The reports imply signaling overhead, especially considering that in time division duplex systems there may be a need for guard time to switch from a receiver to a transmitter state.

Certain embodiments of the present invention provide alternatives for the arrangement of such interference reports in a time division duplex frame structure, considering different physical layer configurations. Overhead from reporting is minimized in certain embodiments, while still supporting use of distributed schedulers. Interference-aware scheduling can involve making scheduling decisions that maximize system utility for a current frame. For advanced local area network operation, a centralized scheduler may not be available. Moreover, a centralized scheduler may not be present in a wide area or heterogeneous system. Alternatively, in some situations a centralized scheduler could be present for a limited number of cells, such as in the context of coordinated multipoint transmission and reception (CoMP) in Long Term Evolution (LTE). Even in that case, there may exist a need to receive information on the interference situation. Thus, each access point may be capable of making its own scheduling decisions. To accomplish such scheduling decisions it may be helpful for each access point to have knowledge of interference victims affected by its own transmissions.

Receivers can signal a situation report, providing knowledge about interference victim receivers (VRX) from a previous frame. This information may include, for example: the channel gain to the victim receivers, which may be measured during the report; signal power at the victim receivers, encoded in the report; and interference-plus-noise power at the victim receivers, encoded in the report.

The interference reports may only give information about past transmissions, but information on a next frame's allocation may be available as well. Without such information about the next frame, the distributed schedulers will have a reduced ability to make the appropriate decisions. However, there may be persistency in the allocations, meaning that with high probability a certain transmitter would use previously used resources for the next transmission.

Each scheduling block, defined as the minimum time-frequency unit that can be allocated to one user, can have an associated report. There are a variety of implications that follow from each scheduling block having an associated report. For example, each data transmission on a resource implies that the transmitter listens to the reports associated to that, and the receiver transmits a report. Moreover, in order to keep overhead low, the size of the scheduling block may be relatively large, for example, with a bandwidth of 4 MHz and a time duration of 1 ms. Since the report is tied to the resource, most nodes that could cause interference to the report sender will be able to receive the report. In principle, there may be no need to signal identities, if all relevant information is contained in the small report. The report can include signal power, interference-plus-noise power, and "priority," for example mean throughput (TP).

A straightforward approach for the reporting would be to define a common control channel in the appropriate link directions where the nodes can transmit the reports, which would include a mapping to the corresponding resources, for example using a bitmap. This means that reports for an interference situation during the downlink (DL) phase would be transmitted in the next uplink (UL) phase, and vice-versa. This option is shown in FIG. 1, which illustrates reports embedded as part of corresponding downlink and uplink resources.

Such an implementation may have various consequences. Reports from cross-slots may not be possible in such an implementation. Even though the uplink/downlink switching point can be flexibly adjusted without interfering with the reports themselves, the link direction where the report takes place is fixed. For example, if a certain subframe that is configured for downlink in cell A was used for uplink in cell B, the corresponding interference source for a receiver in cell A may be a user equipment (UE) from cell B. Hence, this user equipment in cell B may not be able to read any report transmitted during the uplink phase of the cell A, and hence the report cannot reach the most relevant node. This situation is illustrated in FIGS. 2(a) and 2(b).

Figure 2A:
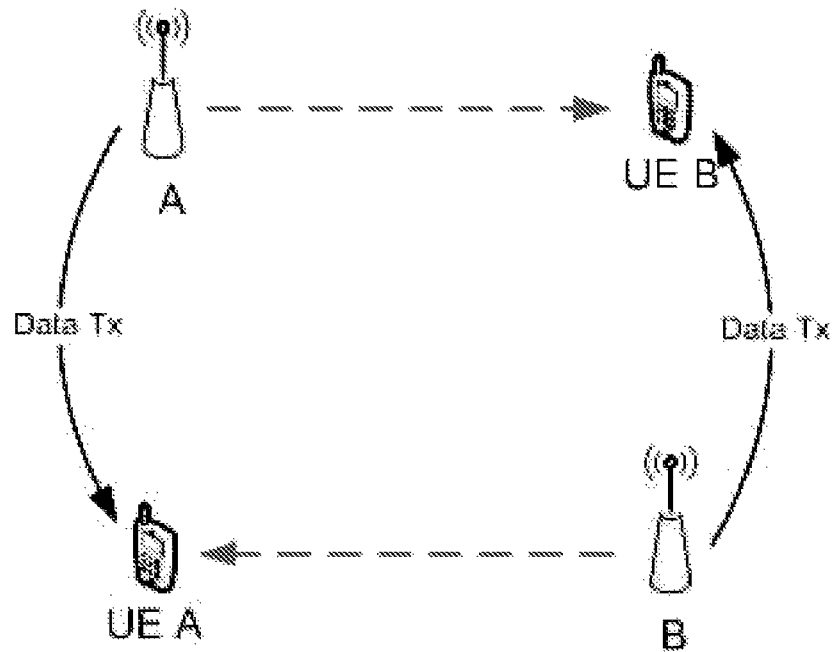
FIGS. 2(a) and 2(b) illustrate the situation of crossed slots that can occur in connection with the frame structure of FIG. 1.
Figure 2B:
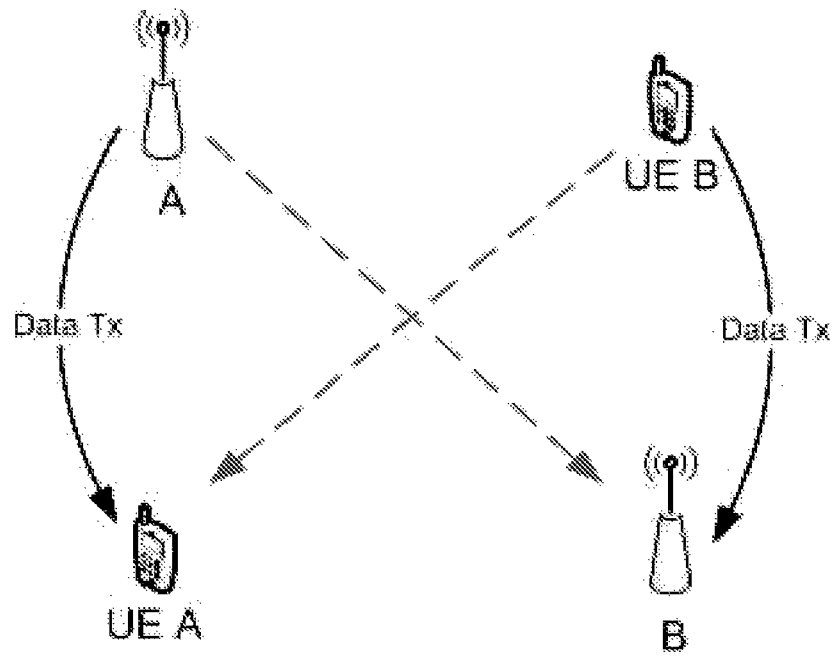

Thus, FIGS. 2(a) and 2(b) illustrate the situation of crossed slots that can occur in connection with the frame structure of FIG. 1. Access point A can cause interference to user equipment (UE) B or access point B depending on the uplink/downlink assignment in interfered cell. If the link direction is uplink in the interfered cell, as in FIG. 2(b), access point A would not be listening to the report from access point B. Thus, the interference to user equipment B's transmission could go unnoticed.

Additionally, according to the option shown in FIG. 1, there may be a delay between the data transmission and the report transmission. While such delay can be managed, this implies a minimum time to be able to respond to changes in the interference situation.

Additionally, cells with a different balance between uplink and downlink transmissions require different amount of resources for reporting. However, in order to allow for flexible uplink/downlink switching points, in this configuration the resources must fit the worst case utilization of both uplink and downlink. This implies that in all cells there will be unutilized resources dedicated for interference reports.

Figure 3:
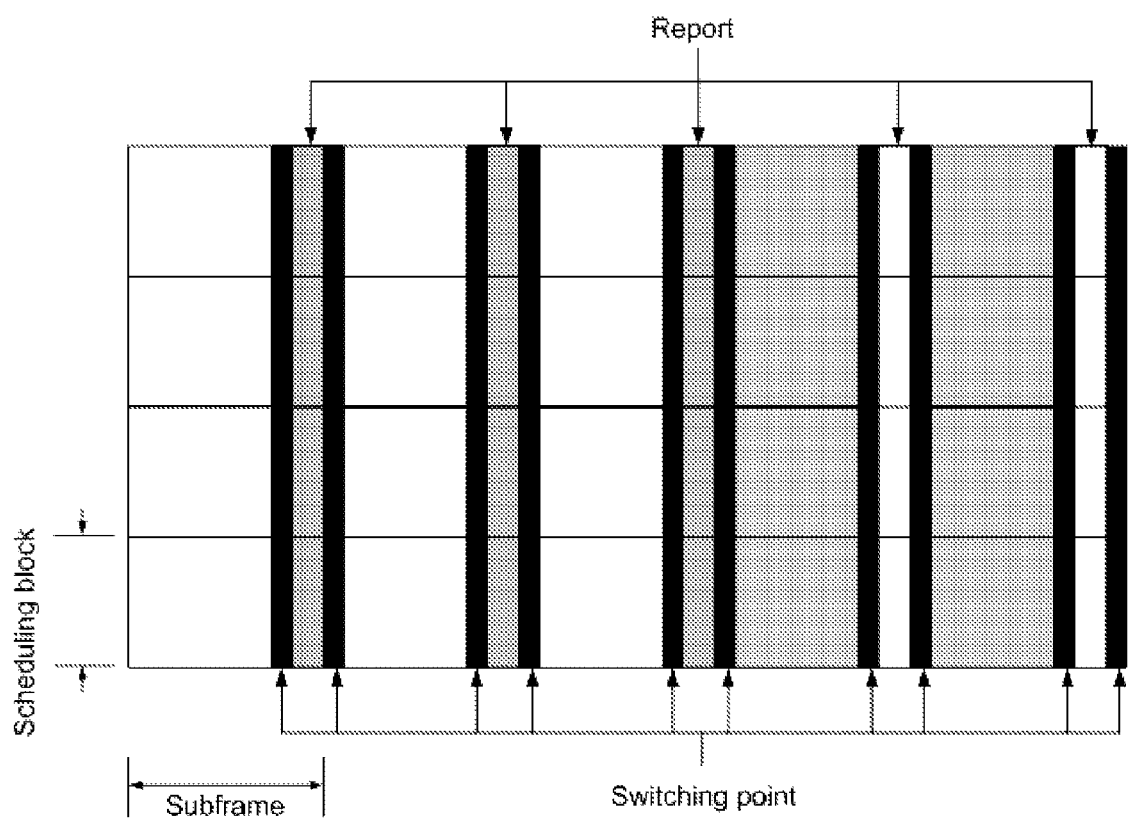
FIG. 3 illustrates a frame structure for interference aware scheduling.

Certain embodiments of the present invention provide a modified frame structure, in which the reports are directly associated with its corresponding resource, as in FIG. 3, which illustrates a frame structure for interference aware scheduling. Such implementation may exhibit a few differences from the one in FIG. 1. There may be no unnecessary delay between the data transmission and report transmission, such as a delay that is longer than a sub-frame. Additionally, the transmitters (interference sources) may always be available to hear the relevant reports, regardless of uplink/downlink switching point configuration per cell. Moreover, since there is a switching guard in every subframe, the link direction may be freely chosen per subframe. Thus, the physical layer delays may be minimized by alternating between uplink and downlink ideally per subframe.

Figure 4:
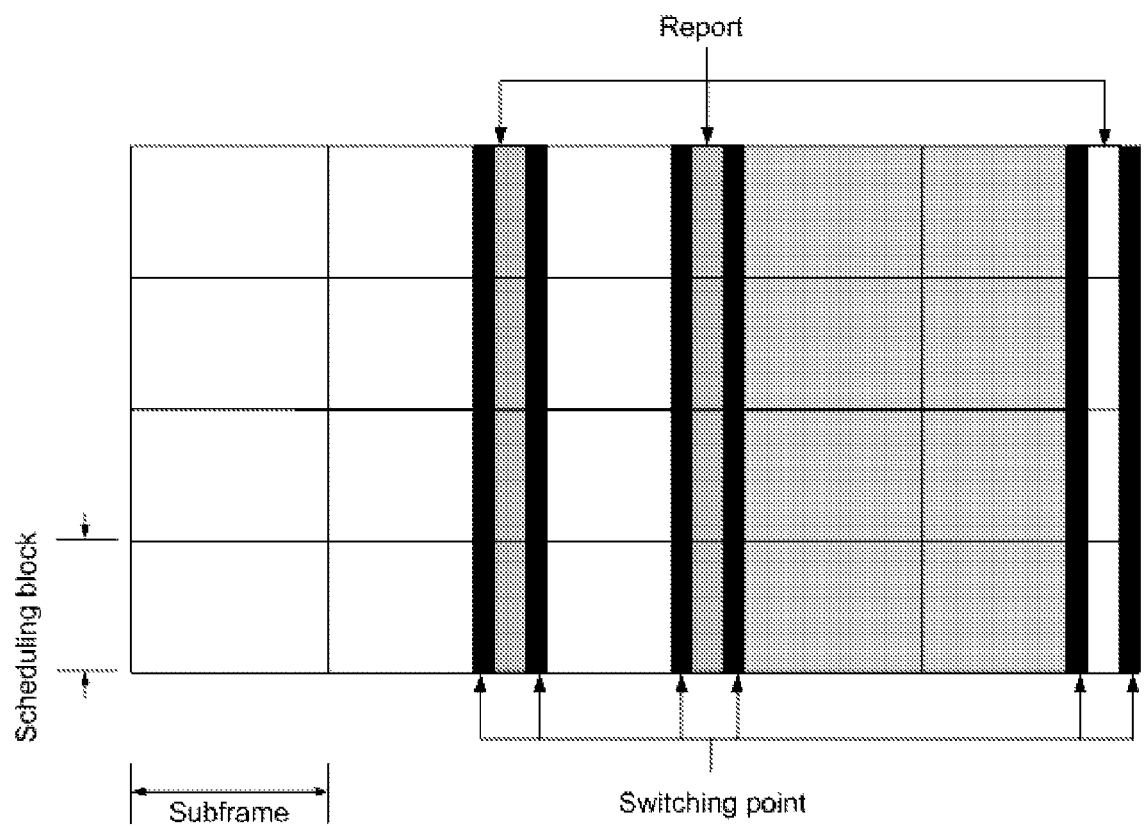
FIG. 4 illustrates a flexible frame structure for interference aware scheduling.

The frame structure of FIG. 3 can incur full overhead and frequent measurements even if there is not much need for interference management. This can happen either when there is very low network load, isolated cells, etc. In order to avoid this situation, especially for the cases mentioned above where there may not be enough available time in the frame for the extra switching points, the extra flexibility of the frame structure shown in FIG. 4, which illustrates a flexible frame structure for interference aware scheduling, can be used.

Thus, the overhead and measurement frequency can be reduced in various ways. First, dropping the report from designated subframes can reduce overhead directly. Users in favorable positions can be scheduled to the corresponding subframes without penalty on the system performance. Second, combining the report from several subframes to a single subframe can yield the same amount of reports, but some switching guard periods may be saved. Under some frame numerologies this may reduce the overhead. In addition, there can be extra room/flexibility for channel coding of the reports in the longer report period.

A consequence of combining the reports from several subframes is that the link direction may be prevented from being changed, to avoid the issues described with respect to FIG. 2, thus reducing the flexibility for adapting the uplink/downlink ratio according to asymmetric traffic load. Hence, a mechanism for adapting the frame structure to the traffic load can take into account the possibilities given by the flexible frame structure, which in turn depends on network topology.

If all subframes need to be covered with reports and also overhead needs to be reduced, it is possible to define frame structures that span multiple frames. For instance, if there are four subframes in a frame, the frame structure may be periodic with two frame periodicity, where every other frame includes reports in subframes 1 and 3 and every other frame includes reports in subframes 2 and 4. In this manner, all subframes will be covered with reports, but the associated overhead is reduced to half of the full reporting case. The tradeoff is that the reports are sent less often, which means that the system will adapt to changing conditions slower and/or the scheduling decisions are less accurate in the sense of system performance maximization. In another embodiment, the reports may be included in every subframe, but only in every n-th frame. This would achieve the same effect, reducing the overhead by factor of n.

Assuming the system to be synchronized at the cyclic prefix level, the reports can be synchronized as well. If all reports occupy the same bandwidth, additional reliability can be achieved by orthogonalizing them. This orthogonalization can be done in frequency domain or code domain. Time domain orthogonalization is possible as well but may involve a very small amount (in the range of 1-3) OFDM symbols for reporting per subframe. Note that, for reliability, orthogonalization of the reports can be performed in different cells, rather than within the cell. This is due to the fact that, since the report is always explicitly tied to the data transmission, the reports can occur on orthogonal resources within the cell because there is no reuse of resources within a cell.

The reports can occupy the same bandwidth as the data message itself. Channel reciprocity of this sort can allow more accurate channel gain measurement to interference victims. Also, this type of configuration is simple and does not require a large amount of overhead to arrange.

In principle it is possible to arrange the reporting in an arbitrary resource. The mapping between data resources and report resource (sub-carrier set, code index, symbol index) can be commonly agreed upon by all the nodes in the network. This can be achieved several different ways. For example, this agreement can be obtained by explicitly mapping, in the sense that the reporting resource follows the data resource immediately and occupies the exact same bandwidth. The agreement can be obtained by signaling the mapping in the network to all nodes, or by making the mapping pre-defined (for example, by an industrial standard) and hard-coded to the devices along with the associated frame configuration. The mapping can alternatively be signaled together with the reports themselves, for example as a bitmap. This type of mapping can be used when the reporting resources are separated by users, and each user would indicate the resources that have been used for interference measurement.

Certain embodiments of the present invention may feature various characteristics. For example, certain embodiments may feature mapping of interference reports to a time division duplex frame structure in a way that there is an explicit mapping between the resources used for data transmission and the interference reports. Certain embodiments may also feature synchronization of such interference reports and the possible orthogonalization of reports among cells. Likewise, certain embodiments may feature signaling of resources to be used for reporting and mapping between data resources and reporting resources. Negotiation of frame structure arrangements between access points in a distributed manner or with the assistance of a central node may also be featured in certain embodiments of the present invention. Additionally, certain embodiments of the present invention may feature using a frame structure that varies from frame to frame, but is periodic with a longer time interval than the frame, for instance a superframe.

A general implementation of the frame structure arrangements according to certain embodiments have been discussed above. Nevertheless, further explanation of the signaling mechanisms used for setting up a common frame structure may also be helpful to an understanding of certain embodiments of the present invention.

The arrangement of the frame structure and organization of reports may result in a variety of supporting signaling characteristics. For example, a mechanism may be provided for the cells to be able to reach a common view of which frame structure is the most advantageous and fair. The current frame structure and report organization can be shared within the nodes in the network. In case reports are orthogonalized, a mechanism must be provided for assigning an orthogonal report channel to each cell. For example, an orthogonal channel can be assigned based on the cell identifiers, in which case orthogonality is not necessarily guaranteed among all neighbors. The orthogonal channel used in the cell for the reports can be broadcast to the terminals. This can be achieved by higher layer signaling between the access point and the one or more user equipment (UEs).

Figure 5:
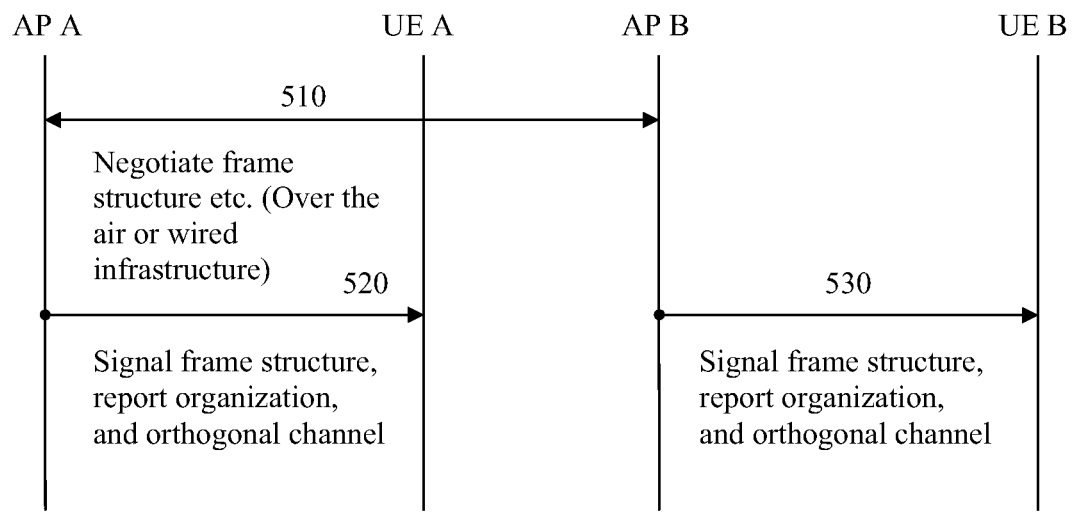
FIG. 5 illustrates a signaling diagram of an example of setting up a frame structure, report organization, and orthogonal channels in a case where no support node is available, according to an embodiment of the present invention.

Various implementations are possible, the following implementations simply serving as non-limiting examples. If there is a wired infrastructure link between the cell's base stations (X2 in long term evolution (LTE)), the inter-cell communication related to agreeing the frame structure and orthogonal channel distribution can be done over this link. FIG. 5 provides an example of this kind of implementation.

Specifically, FIG. 5 is a signaling diagram of an example of setting up a frame structure, report organization, and orthogonal channels in the case where no support node is available. As shown in FIG. 5, at 510, access point (AP) A can negotiate frame structure and the like over the air or a wired infrastructure with access point B. After the negotiation, at 520, access point A can signal frame structure, report organization, and orthogonal channel to user equipment (UE) A, while, at 530, access point B signals frame structure, report organization, and orthogonal channel to user equipment B.

Figure 12:
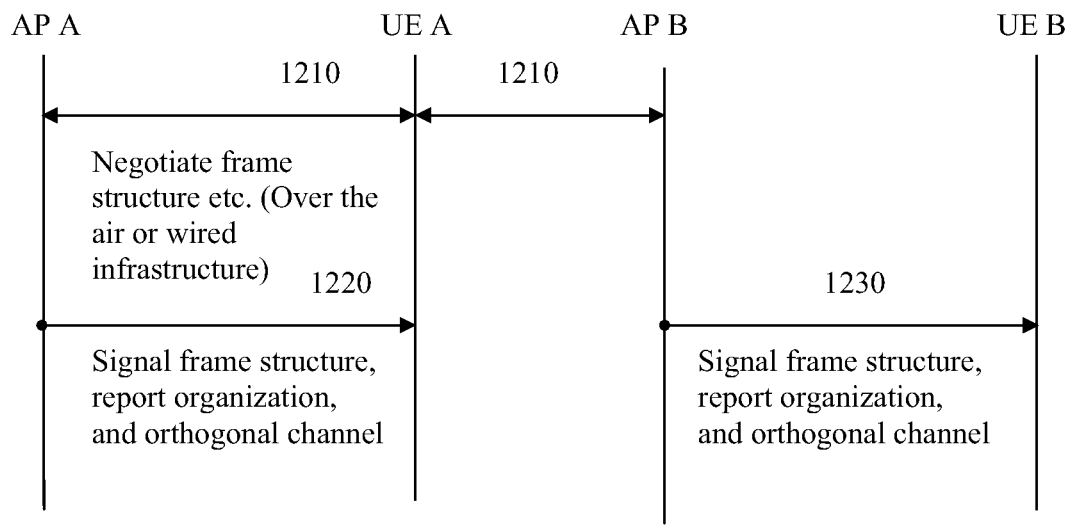
FIG. 12 illustrates a signaling diagram of an example of setting up a frame structure, report organization, and orthogonal channels in a case where no support node is available and relaying is used between access points, according to an embodiment of the present invention.

If the infrastructure does not allow inter-cell signaling, signaling can be organized over-the-air. This is possible by relaying the signaling from one base station to another via one or more user equipment or other relay stations, or by reserving access-point-to-access-point (AP-to-AP) communication resources in specific frames. See FIG. 12 for an example of such an implementation. As shown in FIG. 12, access point A can, at 1210, negotiate frame structure and the like over the air or a wired infrastructure with access point B, relayed by user equipment A. After the negotiation, access point A can signal, at 1220, frame structure, report organization, and orthogonal channel to user equipment A, while access point B signals, at 1230, frame structure, report organization, and orthogonal channel to user equipment B. Thus, the relayed implementation is modified such that the signaling is not directly between the access points, but instead passes through at least one user equipment or relay node.

Alternatively, when there is a central node to which the access points are connected, communication can be achieved via such node. For example, advanced local area networks may have a support node (SN), which provides support functions for the access points connected to its sub-net, or limited support to all such advanced local area networks in a certain area. The certain area may be a very large area, such as a country, or a smaller area, such as an office building. Assistance in the assignment of cell identifiers (IDs) by the support node is not a mandatory feature, but it may be present in enterprise networks, for example. See FIG. 6 for an example implementation involving a support node.

Figure 6:
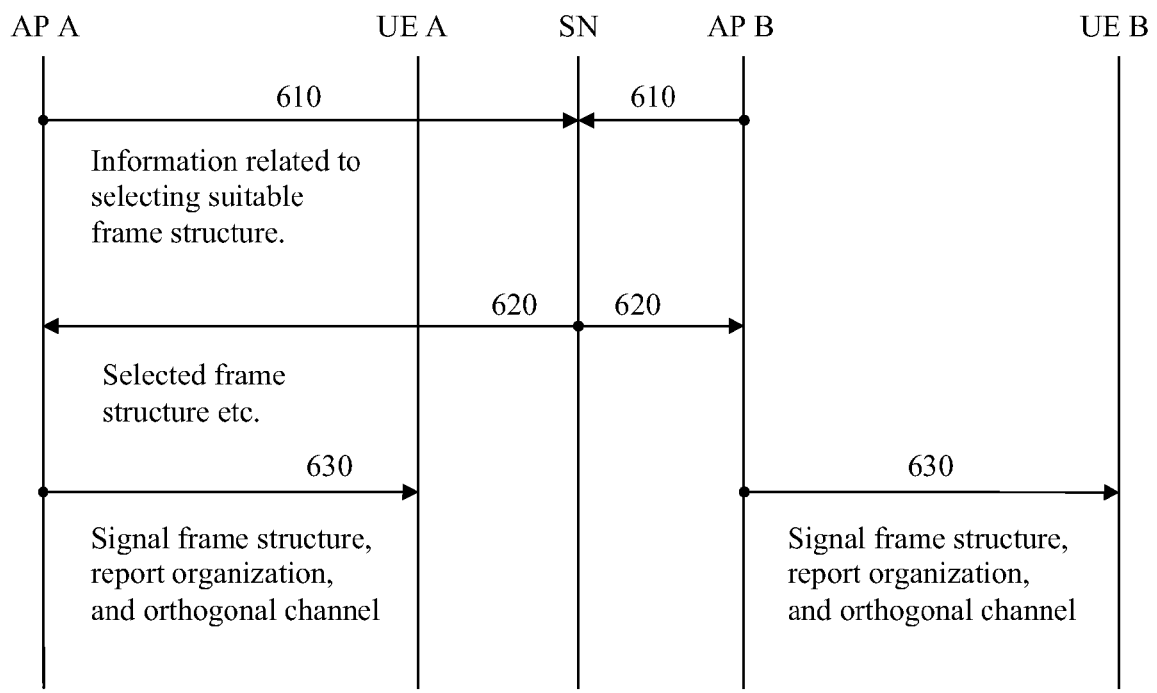
FIG. 6 illustrates a signaling diagram of an example of setting up a frame structure, report organization and orthogonal channels in a support node assisted case, according to an embodiment of the present invention.

Specifically, FIG. 6 is a signaling diagram of an example of setting up a frame structure, report organization and orthogonal channels in a support node assisted case. As shown in FIG. 6, access point (AP) A and access point B can, at 610, send the support node (SN) information related to selecting a suitable frame structure. The support node can then supply, at 620, a selected frame structure and the like to access point A and access point B. Then access point A and access point B can signal, at 630, to respective user equipment (UE) A and user equipment B, frame structure, report organization and orthogonal channel.

For any frame structure described above, either agreed by negotiation or pre-defined by a standard, the orthogonal reporting channel selection may be achieved in a distributed manner. For example, each cell may sense the neighboring cells transmissions and select the least interfered orthogonal reporting channel, or the channel may be selected based on the cell identifier. See FIG. 7 for an example of a distributed implementation.

Figure 7:
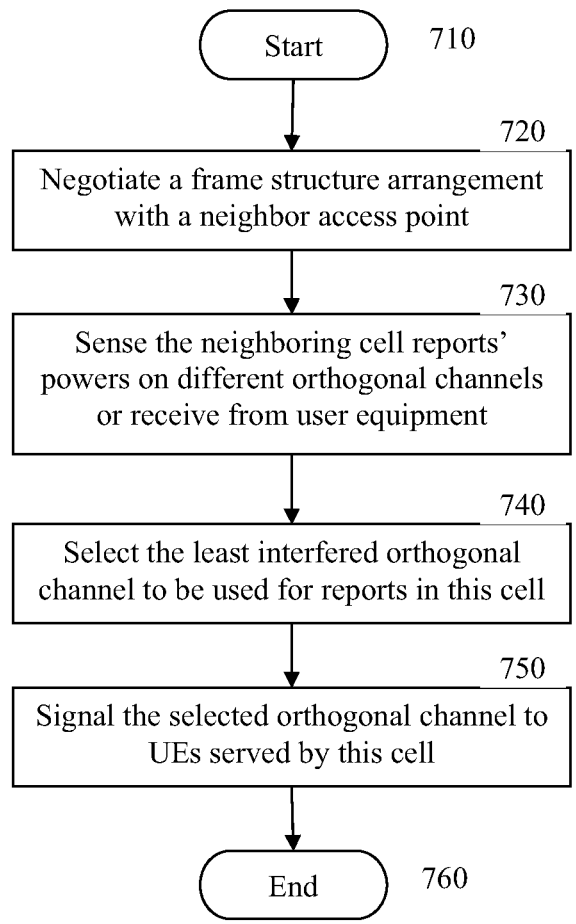
FIG. 7 illustrates a process for distributed selecting and signaling an orthogonal reporting channel in the access point.

Specifically, FIG. 7 illustrates a process for distributed selecting and signaling an orthogonal reporting channel in the access point. As shown in FIG. 7, a process may begin at 710. The process can include negotiating, at 720, a frame structure arrangement with a neighboring access point. A neighboring access point can be considered the access point of a neighboring cell. This negotiation can be direct or indirect—for example the negotiation can be mediated by a support node or relayed by user equipment. The process can continue, at 730, by an access point sensing the power of neighboring cell reports on different orthogonal channels or receiving the power values as sensed by and reported from at least one user equipment. In an example embodiment, the access point may receive the power values sensed by and reported from a plurality of user equipments. Then, the access point based in part on the assessment can select, at 740, the least interfered orthogonal channel to be used for reports in its own cell. Finally, the access point can, at 750, signal the selected orthogonal channel to one or more user equipment served by the cell. The process can then end at 760.

Figure 8:
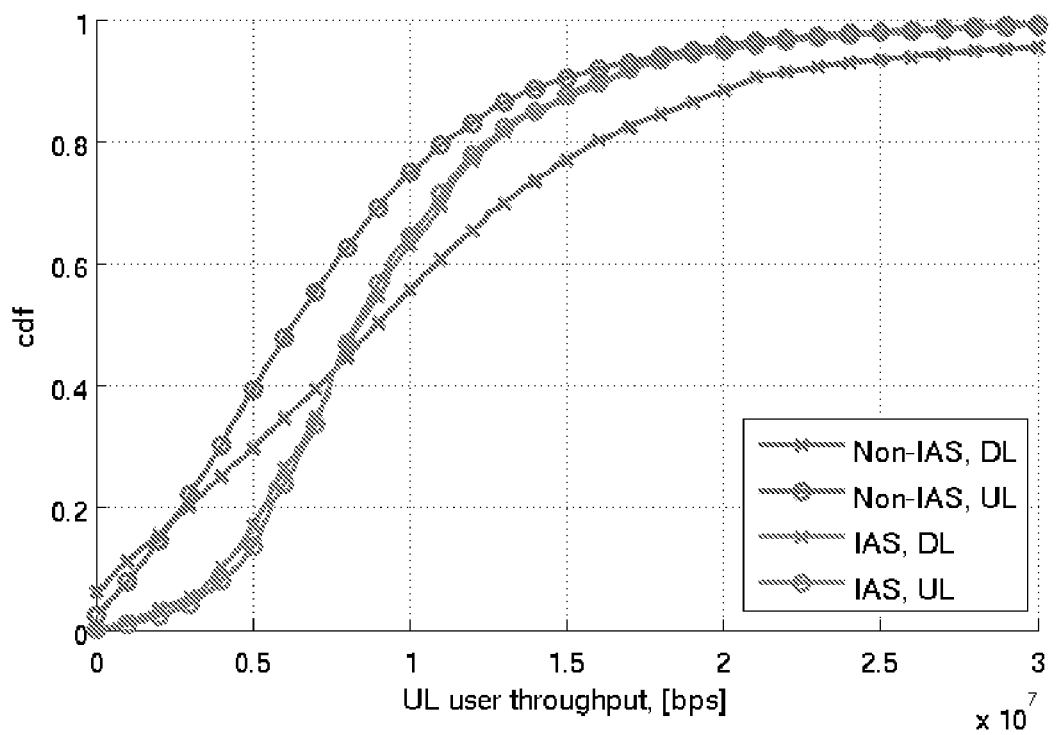
FIG. 8 illustrates a comparison between interference aware scheduling and non-interference aware scheduling.

Certain embodiments of the present invention enable the practical implementation of interference aware scheduling. FIG. 8 shows an example of the performance benefit obtained using interference aware scheduling (IAS) over traditional non-interference aware proportional fair scheduler. In the simulated scenario there is a common area for user equipment served by four different cells where each user equipment is not allowed to be served by the -cell with highest received energy. These user equipment may suffer from severe interference and may thus be in outage. This problem is mitigated using interference aware scheduling and all the user equipment may be served, thus maximizing the system-wide fairness.

Specifically, FIG. 8 illustrates a comparison between interference aware scheduling and non-interference aware scheduling. More particularly, FIG. 8 provides a comparison of user throughput cumulative distribution functions (CDFs) with and without inference aware scheduling (IAS). The simulated scenario is an indoor/office scenario, with 4 cells and average 2 user equipment per cell. The user equipment, in this simulation, are connected to the geometrically closest access point, with the exception of a common area in the middle of the scenario, where user equipment associate to a random access point. Interference aware scheduling is configured, for this example, to maximize system-wide proportional fairness.

Figure 9:
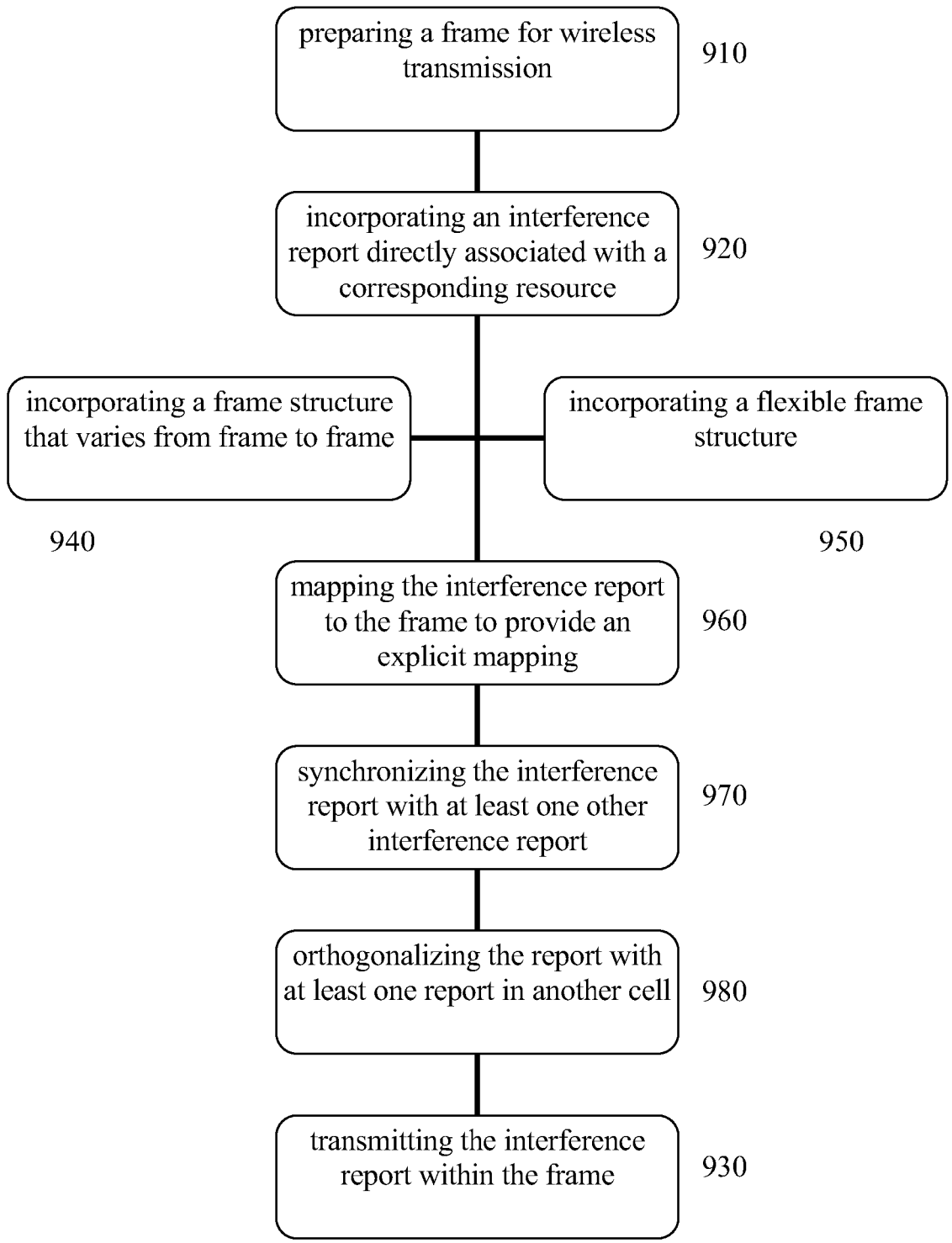
FIG. 9 illustrates a method according to certain embodiments of the present invention.

FIG. 9 illustrates a method according to certain embodiments of the present invention. The method of FIG. 9 can be performed, for example, by a user equipment. As illustrated, the method includes preparing 910 a frame for transmission, for example, in a wireless communication system. The preparing 910 the frame may simply constitute the preparation of a portion of the frame that a particular device is to provide, since an entire frame may involve transmissions by many devices. The method also includes incorporating 920 an interference report into the frame, wherein the interference report is directly associated with a corresponding resource. The method further includes transmitting 930 the interference report within the frame in the wireless communication system. The frame can be a time division duplex frame. The transmission target of the frame can be an access point or another user equipment.

The incorporating 920 can specifically include incorporating 940 a frame structure that varies from frame to frame, but is periodic with a longer time interval than the frame. The incorporating 920 can further include incorporating 950 a flexible frame structure.

The method can additionally include mapping 960 the interference report to the frame to provide an explicit mapping between the resources used for data transmission and the interference reports. The method can also include synchronizing 970 the interference report with at least one other interference report. The method can further include orthogonalizing 980 the report with at least one report in another cell.

Figure 10:
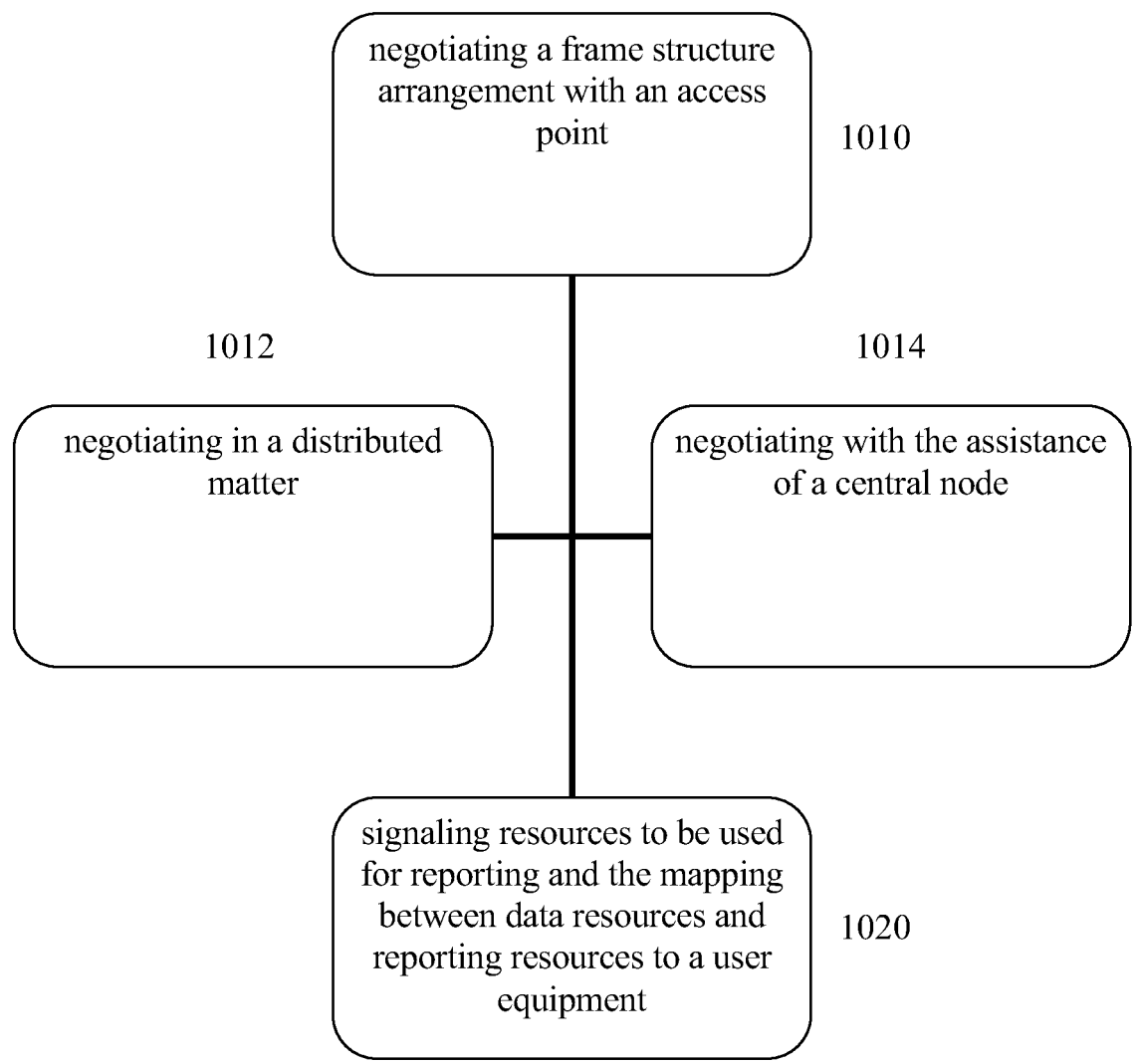
FIG. 10 illustrates a method according to alternative embodiments of the present invention.

FIG. 10 illustrates another method according to certain embodiments of the present invention. The method may be performed by an access point. The method, as illustrated, includes negotiating 1010 a frame structure arrangement with an access point. The negotiating 1010 the frame structure can include direct negotiations with another access point or having a support node determine the frame structure and signal the frame structure to the access points, which may be viewed as an arbitrated negotiation. The method also includes signaling 1020 resources to be used for reporting and the mapping between data resources and reporting resources to a user equipment.

The negotiating 1010 the frame structure arrangement with the access point can involve negotiating 1012 in a distributed manner. Alternatively, the negotiating 1010 the frame structure arrangement with the access point can involve negotiating 1014 with the assistance of a central node.

The above identified methods can be variously implemented. For example, the methods can be implemented via computer instructions embodied on a computer-readable medium, which, when executed in hardware, control a processor to perform a method.

Figure 11:
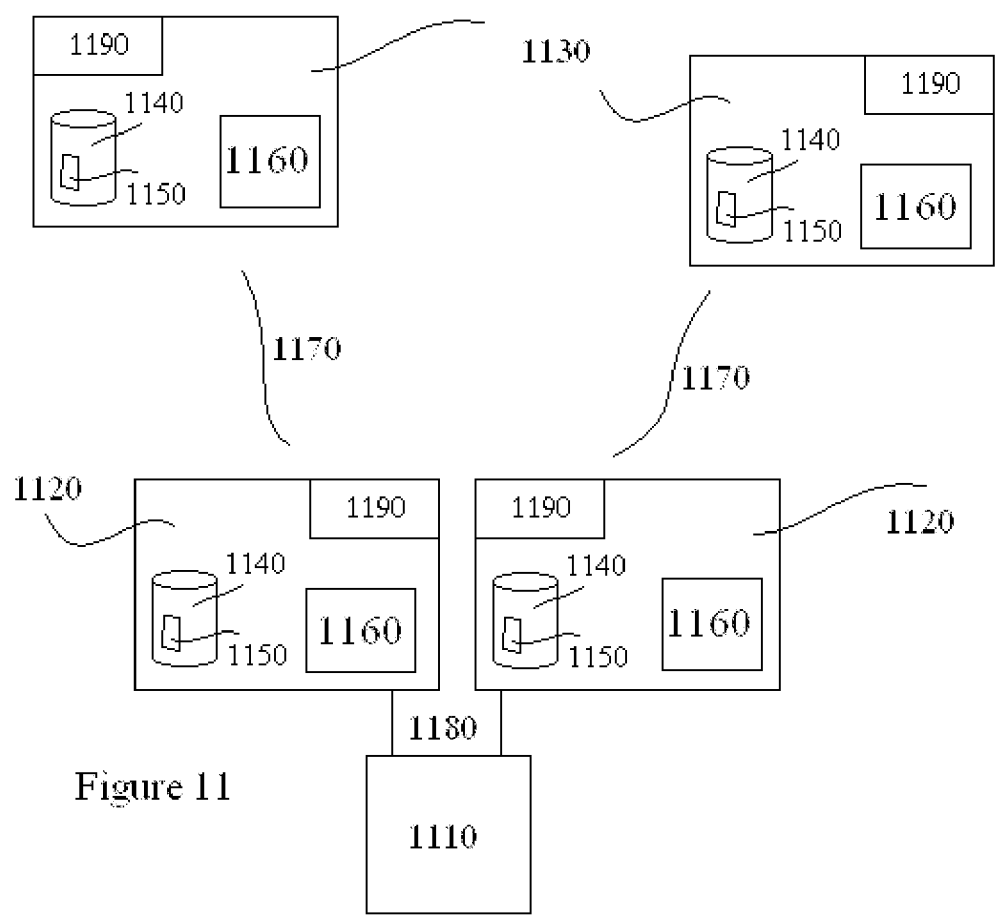
FIG. 11 illustrates a system according to certain embodiments of the present invention.

FIG. 11 illustrates a system according to certain embodiments of the present invention. As shown in FIG. 11, the system can include a support node 1110, one or more access points 1120, and one or more user equipment 1130. Each access point 1120 may be, for example, any suitable wireless access point, such as a base station of a cell, an access point of a wireless local area network or femtocell, or an evolved Node B (eNodeB).

Each of the support node 1110, access point(s) 1120, and user equipment 1130 may be of similar construction. Each may include at least one memory 1140 including computer program instructions 1150 and at least one processor 1160. Each may also include additional hardware, such as transceiver 1190. The transceiver 1190 may be configured to transmit and receive signals over a wireless and/or wired network. In certain embodiments, the transceiver 1190 may be configured for multi-mode operation.

The at least one memory 1140 and the computer program instructions 1150 may be configured to, with the at least one processor 1160, perform a method (or cause the device including those components to perform the method), such as one of the methods discussed above.

For example, the at least one memory and the computer program instructions 1150 may be configured to, with the at least one processor 1160 and optionally the transceiver 1190, cause one of the user equipment 1130 to prepare a relevant portion of a frame for transmission in a wireless communication system. The same components may be configured to cause the user equipment 1130 to incorporate an interference report into the frame. The same user equipment 1130 can employ the transceiver to transmit the interference report within the frame in the wireless communication system.

Likewise, the at least one memory and the computer program instructions 1150 may be configured to, with the at least one processor 1160 and optionally the transceiver 1190, cause one of the access points 1120 to negotiate a frame structure agreement with another access point 1120 and to signal resources to be used for reporting and the mapping between data resources and reporting resources to at least one of the user equipment 1130.

The at least one memory 1140 may be any suitable computer-readable storage medium, such as a hard disc drive, a random access memory (RAM), or a read only memory (ROM). The computer program instructions 1150 may be any suitable form of instructions readable by a computer, such as compiled instructions or interpreted instructions. The at least one processor 1160 may be one or more central processing unit (CPU), controller, or the like. The at least one memory 1140 and the at least one processor 1160 can be embodied on a single chip.

The user equipment 1130 and access point(s) 1120 may be configured to communicate over wireless links 1170, and the access point(s) 1120 may be connected to the support node 1110 over a wired link 1180.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
   preparing a frame for transmission in a wireless communication system, wherein the frame comprises a plurality of sub-frames;
   incorporating a plurality of interference reports into the frame, wherein each sub-frame of the plurality of sub-frames comprises a scheduling block and an interference report directly associated with the scheduling block; and
   transmitting the interference reports within respective sub-frames of the frame in the wireless communication system.

2. The method of claim 1, wherein preparing the frame comprises preparing a time division duplex frame.

3. The method of claim 1, wherein the incorporating comprises incorporating a frame structure that varies from frame to frame, but is periodic with a longer time interval than the frame.

4. The method of claim 1, wherein the incorporating comprises incorporating a flexible frame structure.

5. The method of claim 1, further comprising:
   mapping the interference report to the frame to provide an explicit mapping between the resources used for data transmission and the interference reports.

6. The method of claim 1, further comprising:
   synchronizing the interference report with at least one other interference report.

7. The method of claim 1, further comprising:
   orthogonalizing the report with at least one report in another cell.

8. The method of claim 1, wherein the interference report comprises information about a next frame's allocation.

9. An apparatus, comprising:
   at least one memory including computer program code; and
   at least one processor,
   wherein the at least one memory and the computer program code are configured to, with the at least one processor, cause the apparatus at least to
   preparing a frame for transmission in a wireless communication system, wherein the frame comprises a plurality of sub-frames;
   incorporating a plurality of interference reports into the frame, wherein each sub-frame of the plurality of sub-frames comprises a scheduling block and an interference report directly associated with the scheduling block; and
   transmitting the interference reports within respective sub-frames of the frame in the wireless communication system.

10. The apparatus of claim 9, wherein the at least one memory and the computer program code are configured to, with the at least one processor, cause the apparatus at least to prepare the frame as a time division duplex frame.

11. The apparatus of claim 9, wherein the at least one memory and the computer program code are also configured to, with the at least one processor, cause the apparatus at least to use a frame structure that varies from frame to frame, but is periodic with a longer time interval than the frame.

12. The apparatus of claim 9, wherein the at least one memory and the computer program code are configured to, with the at least one processor, cause the apparatus at least to use a flexible frame structure.

13. The apparatus of claim 9, wherein the at least one memory and the computer program code are also configured to, with the at least one processor, cause the apparatus at least to map the interference report to the frame to provide an explicit mapping between the resources used for data transmission and the interference reports.

14. The apparatus of claim 9, wherein the at least one memory and the computer program code are also configured to, with the at least one processor, cause the apparatus at least to synchronize the interference report with at least one other interference report.

15. The apparatus of claim 9, wherein the at least one memory and the computer program code are also configured to, with the at least one processor, cause the apparatus at least to orthogonalize the report with at least one report in another cell.

16. The apparatus of claim 9, wherein the at least one memory and the computer program code are also configured to, with the at least one processor, cause the apparatus at least to incorporate information about a next frame's allocation into the interference report.

17. A non-transitory computer-readable medium encoded with instructions that, when executed in hardware, perform a process, the process comprising:
   preparing a frame for transmission in a wireless communication system, wherein the frame comprises a plurality of sub-frames;
   incorporating a plurality of interference reports into the frame, wherein each sub-frame of the plurality of sub-frames comprises a scheduling block and an interference report directly associated with the scheduling block; and
   transmitting the interference reports within respective sub-frames of the frame in the wireless communication system.

18. The non-transitory computer-readable medium of claim 17, wherein preparing the frame comprises preparing a time division duplex frame.

19. The non-transitory computer-readable medium of claim 17, further comprising:
   mapping the interference report to the frame to provide an explicit mapping between the resources used for data transmission and the interference reports.

20. The non-transitory computer-readable medium of claim 17, further comprising:
   orthogonalizing the report with at least one report in another cell.

21. The method of claim 5, wherein the explicit mapping comprises a reporting resource immediately following a data resource and occupying the same bandwidth as the data resource.

22. The method of claim 1, wherein the interference report is directly associated with a particular scheduling block.

23. The method of claim 1, wherein the transmitting the interference report comprises transmitting a report regarding an interference situation during a downlink phase during a next uplink phase, or transmitting a report regarding an interference situation during an uplink phase during a next downlink phase.

* * * * *